US007634605B2

(12) United States Patent
Laefer et al.

(10) Patent No.: US 7,634,605 B2
(45) Date of Patent: Dec. 15, 2009

(54) METHOD AND SYSTEM FOR TRANSFERRING STORED DATA BETWEEN A MEDIA PLAYER AND AN ACCESSORY

(75) Inventors: Jay S. Laefer, Sunnyvale, CA (US); Scott Krueger, San Francisco, CA (US); Gregory T. Lydon, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 119 days.

(21) Appl. No.: 11/439,494

(22) Filed: May 22, 2006

(65) Prior Publication Data

US 2007/0028006 A1 Feb. 1, 2007

(51) Int. Cl.
*G06F 13/00* (2006.01)
*G06F 15/177* (2006.01)

(52) U.S. Cl. ...................... 710/303; 710/35; 707/104.1; 709/220; 709/230

(58) Field of Classification Search .................. 710/303
See application file for complete search history.

(56) References Cited

U.S. PATENT DOCUMENTS

| | | | |
|---|---|---|---|
| 4,673,861 | A | 6/1987 | Dubovsky et al. |
| 4,850,899 | A | 7/1989 | Maynard |
| 4,916,334 | A | 4/1990 | Minagawa et al. |
| 4,924,216 | A | 5/1990 | Leung |
| 4,938,483 | A | 7/1990 | Yavetz |
| 5,041,025 | A | 8/1991 | Haitmanek |
| 5,055,069 | A | 10/1991 | Townsend et al. |
| 5,080,603 | A | 1/1992 | Mouissie |
| 5,104,243 | A | 4/1992 | Harding |
| 5,108,313 | A | 4/1992 | Adams |
| 5,150,031 | A | 9/1992 | James et al. |
| 5,186,646 | A | 2/1993 | Pederson |
| 5,247,138 | A | 9/1993 | Landmeier |
| 5,277,624 | A | 1/1994 | Champion |
| 5,471,128 | A | 11/1995 | Patino et al. |
| 5,525,981 | A | 6/1996 | Abernethy |
| 5,586,893 | A | 12/1996 | Mosquera |
| 5,592,588 | A | 1/1997 | Reekes et al. |

(Continued)

FOREIGN PATENT DOCUMENTS

| | | |
|---|---|---|
| EP | 1104150 | 5/2001 |

(Continued)

OTHER PUBLICATIONS

Universal Serial Bus Specification Revision 2.0: Apr. 27, 2000, 5 pages.*

(Continued)

*Primary Examiner*—Mark Rinehart
*Assistant Examiner*—Brian T Misiura
(74) *Attorney, Agent, or Firm*—Townsend and Townsend and Crew LLP

(57) ABSTRACT

A method, system and connector interface for transferring stored data between a media player and an accessory is disclosed. The method and system comprises obtaining by one of the media player and the accessory a unique identifier for a particular file stored in the other of the media player and the accessory; and returning the unique identifier with the stored file data to the one of the media player and the accessory. The system and method includes utilizing the stored file by the one of the media player or the accessory. In the method, system and connector interface in accordance with the present invention, accessories and media players are able to retrieve and store data utilizing an arbitrary format. This data is opaque to any protocol used by the media player and requires no parsing or interpretation. To provide this facility, a plurality of commands allows both media players and accessories to present a simple file system. The plurality of commands could be utilized in a variety of environments.

23 Claims, 11 Drawing Sheets

U.S. PATENT DOCUMENTS 5,618,045 A 4/1997 Kagan et al.
5,648,712 A 7/1997 Hahn
5,660,558 A 8/1997 Osanai et al.
5,727,866 A 3/1998 Kraines et al.
5,732,361 A 3/1998 Liu
5,754,027 A 5/1998 Oglesbee et al.
5,830,001 A 11/1998 Kinoshita
5,835,862 A 11/1998 Nykanen et al.
5,845,217 A 12/1998 Lindell et al.
5,859,522 A 1/1999 Theobald
5,901,049 A 5/1999 Schmidt et al.
5,964,847 A 10/1999 Booth et al.
5,975,957 A 11/1999 Noda et al.
6,007,372 A 12/1999 Wood
6,012,105 A 1/2000 Rubbmark et al.
6,031,797 A 2/2000 Van Ryzint et al.
6,053,773 A 4/2000 Wu
6,078,402 A 6/2000 Fischer et al.
6,078,789 A 6/2000 Bodenmann et al.
6,125,455 A 9/2000 Yeo
6,130,518 A 10/2000 Gabehart et al.
6,139,373 A 10/2000 Ward et al.
6,154,773 A 11/2000 Roberts et al.
6,154,798 A 11/2000 Lin et al.
6,161,027 A 12/2000 Poirel
6,169,387 B1 1/2001 Kaib
6,175,358 B1 1/2001 Scott-Jackson et al.
6,178,514 B1 1/2001 Wood
6,184,652 B1 2/2001 Yang
6,184,655 B1 2/2001 Malackowski
6,188,265 B1 2/2001 Liu et al.
6,203,345 B1 3/2001 Roque et al.
6,204,637 B1 3/2001 Rengan
6,206,480 B1 3/2001 Thompson
6,211,581 B1 4/2001 Farrant
6,211,649 B1 4/2001 Matsuda
6,224,420 B1 5/2001 Nishio et al.
6,230,205 B1 * 5/2001 Garrity et al. ............... 709/231
6,234,827 B1 5/2001 Nishio et al.
6,252,380 B1 6/2001 Koenck
6,261,109 B1 7/2001 Liu et al.
6,267,623 B1 7/2001 Hisamatsu
6,268,845 B1 7/2001 Pariza et al.
6,271,605 B1 8/2001 Carkner et al.
6,280,251 B1 8/2001 Nishio et al.
6,283,789 B1 9/2001 Tsai
6,304,764 B1 10/2001 Pan
6,314,479 B1 11/2001 Frederick et al.
6,316,916 B2 11/2001 Bohne
6,322,396 B1 11/2001 Kuan
6,344,727 B1 2/2002 Desai et al.
6,353,894 B1 3/2002 Pione
6,354,713 B1 3/2002 Leifer et al.
6,358,089 B1 3/2002 Kuroda et al.
6,372,974 B1 * 4/2002 Gross et al. ................... 84/609
6,385,596 B1 * 5/2002 Wiser et al. ................... 705/51
6,394,905 B1 5/2002 Takeda et al.
6,429,879 B1 8/2002 Sturgeon et al.
6,431,915 B1 8/2002 Ko
6,453,371 B1 9/2002 Hampson et al.
6,454,592 B2 9/2002 Takagi
6,461,173 B1 10/2002 Mizuno et al.
6,464,542 B1 10/2002 Lee
6,468,110 B2 10/2002 Fujino et al.
6,478,603 B1 11/2002 Wu
6,483,428 B1 11/2002 Fish et al.
6,485,328 B1 11/2002 Wu
6,489,751 B2 12/2002 Small et al.
6,505,160 B1 1/2003 Levy et al.
6,524,119 B2 2/2003 Kato et al.
6,526,287 B1 2/2003 Lee
6,558,201 B1 5/2003 Begley et al.
6,577,877 B1 6/2003 Charlier et al.
6,589,076 B1 7/2003 Davis et al.
6,591,085 B1 7/2003 Grady
6,608,264 B1 8/2003 Fouladpour
6,608,399 B2 8/2003 McConnell et al.
6,614,232 B1 9/2003 Mukai
6,616,473 B2 9/2003 Kamata et al.
6,629,197 B1 9/2003 Bhogal et al.
6,642,629 B2 11/2003 DeLeeuw
6,651,138 B2 * 11/2003 Lai et al. .................... 711/115
6,653,813 B2 11/2003 Khatri
6,663,420 B1 12/2003 Xiao
6,665,803 B2 12/2003 Lunsford et al.
6,674,995 B1 1/2004 Meyers et al.
6,697,944 B1 2/2004 Jones et al.
6,724,339 B2 4/2004 Conway et al.
6,725,061 B1 4/2004 Hutchison, IV et al.
6,728,546 B1 4/2004 Peterson et al.
6,728,729 B1 * 4/2004 Jawa et al. ............... 707/104.1
6,747,859 B2 6/2004 Walbeck et al.
6,754,468 B1 6/2004 Sieben et al.
6,761,635 B2 7/2004 Hoshino et al.
6,774,939 B1 8/2004 Peng
6,776,626 B2 8/2004 Huang et al.
6,776,660 B1 8/2004 Kubota et al.
6,776,665 B2 8/2004 Huang
6,799,226 B1 9/2004 Robbin et al.
6,801,964 B1 10/2004 Mahdavi
6,813,528 B1 11/2004 Yang
6,816,376 B2 11/2004 Bright et al.
6,830,160 B2 12/2004 Risolia
6,859,538 B1 2/2005 Voltz
6,859,854 B2 2/2005 Kwong
6,879,843 B1 * 4/2005 Kim ........................... 455/557
6,928,295 B2 8/2005 Olson et al.
6,931,266 B2 8/2005 Miyoshi et al.
6,931,456 B2 8/2005 Payne et al.
6,939,177 B2 9/2005 Kato et al.
6,991,483 B1 1/2006 Milan et al.
7,004,787 B2 2/2006 Milan
7,050,783 B2 5/2006 Curtiss et al.
7,054,888 B2 * 5/2006 LaChapelle et al. ...... 707/104.1
7,062,261 B2 6/2006 Goldstein et al.
7,108,560 B1 9/2006 Chou et al.
7,127,678 B2 10/2006 Bhesania et al.
7,127,879 B2 10/2006 Zhu et al.
7,167,112 B2 1/2007 Andersen et al.
7,167,935 B2 1/2007 Hellberg
7,187,947 B1 3/2007 White et al.
7,187,948 B2 3/2007 Alden
7,215,042 B2 5/2007 Yan
7,281,214 B2 * 10/2007 Fadell ........................ 715/745
7,293,122 B1 11/2007 Schubert et al.
7,293,227 B2 11/2007 Plastina et al.
7,299,304 B2 11/2007 Saint-Hilaire et al.
7,303,282 B2 12/2007 Dwyer et al.
7,304,685 B2 12/2007 Park et al.
7,305,254 B2 12/2007 Findikli
7,305,506 B1 12/2007 Lydon et al.
7,441,062 B2 10/2008 Novotney et al.
7,444,388 B1 * 10/2008 Svendsen .................... 709/217
7,454,019 B2 11/2008 Williams
2001/0003205 A1 6/2001 Gilbert
2001/0005641 A1 6/2001 Matsumoto et al.
2001/0006884 A1 7/2001 Matsumoto
2002/0002035 A1 1/2002 Sim et al.
2002/0010759 A1 1/2002 Hitson et al.
2002/0029303 A1 3/2002 Nguyen
2002/0065074 A1 5/2002 Cohn et al.
2002/0068610 A1 6/2002 Anvekar et al.
2002/0072390 A1 6/2002 Uchiyama
2002/0103008 A1 8/2002 Rahn et al.

| | | | | |
|---|---|---|---|---|
| 2002/0105861 | A1 | 8/2002 | Leapman | |
| 2002/0108108 | A1 | 8/2002 | Akaiwa et al. | |
| 2002/0115480 | A1 | 8/2002 | Huang | |
| 2002/0116533 | A1* | 8/2002 | Holliman et al. | 709/246 |
| 2002/0132651 | A1 | 9/2002 | Jinnouchi | |
| 2002/0151327 | A1 | 10/2002 | Levitt | |
| 2002/0152874 | A1* | 10/2002 | Vilcauskas et al. | 84/600 |
| 2002/0156546 | A1 | 10/2002 | Ramaswamy | |
| 2002/0156949 | A1 | 10/2002 | Kubo et al. | |
| 2002/0173273 | A1 | 11/2002 | Spurgat et al. | |
| 2002/0174269 | A1 | 11/2002 | Spurgat et al. | |
| 2002/0194621 | A1 | 12/2002 | Tran et al. | |
| 2003/0004934 | A1 | 1/2003 | Qian | |
| 2003/0011608 | A1 | 1/2003 | Wada | |
| 2003/0028664 | A1 | 2/2003 | Tan et al. | |
| 2003/0041206 | A1 | 2/2003 | Dickie | |
| 2003/0059022 | A1 | 3/2003 | Nebiker et al. | |
| 2003/0067741 | A1 | 4/2003 | Alfonso et al. | |
| 2003/0073432 | A1 | 4/2003 | Meade | |
| 2003/0079038 | A1 | 4/2003 | Robbin et al. | |
| 2003/0090998 | A1 | 5/2003 | Lee et al. | |
| 2003/0097379 | A1 | 5/2003 | Ireton | |
| 2003/0110403 | A1 | 6/2003 | Crutchfield et al. | |
| 2003/0151621 | A1 | 8/2003 | McEvilly | |
| 2003/0172209 | A1 | 9/2003 | Liu et al. | |
| 2003/0185395 | A1 | 10/2003 | Lee et al. | |
| 2003/0198015 | A1 | 10/2003 | Vogt | |
| 2003/0220988 | A1 | 11/2003 | Hymel | |
| 2003/0236075 | A1 | 12/2003 | Johnson et al. | |
| 2003/0237043 | A1 | 12/2003 | Novak et al. | |
| 2004/0003300 | A1 | 1/2004 | Malueg et al. | |
| 2004/0019497 | A1* | 1/2004 | Volk et al. | 705/1 |
| 2004/0039860 | A1 | 2/2004 | Mills et al. | |
| 2004/0048569 | A1 | 3/2004 | Kawamura | |
| 2004/0090998 | A1 | 5/2004 | Chen | |
| 2004/0103223 | A1 | 5/2004 | Gabehart et al. | |
| 2004/0116005 | A1 | 6/2004 | Choi | |
| 2004/0162029 | A1 | 8/2004 | Grady | |
| 2004/0164708 | A1 | 8/2004 | Veselic et al. | |
| 2004/0186935 | A1 | 9/2004 | Bel et al. | |
| 2004/0194154 | A1 | 9/2004 | Meadors et al. | |
| 2004/0198436 | A1 | 10/2004 | Alden | |
| 2004/0224638 | A1* | 11/2004 | Fadell et al. | 455/66.1 |
| 2004/0235339 | A1 | 11/2004 | Sato et al. | |
| 2004/0249994 | A1 | 12/2004 | Shapiro et al. | |
| 2004/0252966 | A1 | 12/2004 | Holloway et al. | |
| 2004/0267812 | A1* | 12/2004 | Harris et al. | 707/104.1 |
| 2004/0267825 | A1 | 12/2004 | Novak et al. | |
| 2005/0014119 | A1 | 1/2005 | Rudakov | |
| 2005/0014531 | A1 | 1/2005 | Findikli | |
| 2005/0014536 | A1 | 1/2005 | Grady | |
| 2005/0015355 | A1 | 1/2005 | Heller et al. | |
| 2005/0022212 | A1 | 1/2005 | Bowen | |
| 2005/0135790 | A1 | 6/2005 | Hutten | |
| 2005/0149213 | A1* | 7/2005 | Guzak et al. | 700/94 |
| 2005/0181756 | A1* | 8/2005 | Lin | 455/344 |
| 2005/0207726 | A1 | 9/2005 | Chen | |
| 2005/0239333 | A1 | 10/2005 | Watanabe et al. | |
| 2005/0240705 | A1 | 10/2005 | Novotney et al. | |
| 2005/0281185 | A1* | 12/2005 | Kawasaki | 369/275.3 |
| 2006/0015826 | A1 | 1/2006 | Shiozawa et al. | |
| 2006/0031545 | A1 | 2/2006 | Manders et al. | |
| 2006/0088228 | A1 | 4/2006 | Marriott et al. | |
| 2006/0156415 | A1 | 7/2006 | Rubinstein et al. | |
| 2006/0161621 | A1* | 7/2006 | Rosenberg | 709/204 |
| 2006/0163358 | A1* | 7/2006 | Biderman | 235/472.01 |
| 2006/0184456 | A1 | 8/2006 | de Janasz | |
| 2006/0188237 | A1 | 8/2006 | Watanabe et al. | |
| 2006/0224620 | A1 | 10/2006 | Silverman et al. | |
| 2006/0236245 | A1 | 10/2006 | Agarwal et al. | |
| 2006/0247851 | A1 | 11/2006 | Morris | |
| 2006/0258289 | A1* | 11/2006 | Dua | 455/41.3 |
| 2006/0294209 | A1 | 12/2006 | Rosenbloom et al. | |
| 2007/0018947 | A1 | 1/2007 | Toro-Lira | |
| 2007/0056012 | A1 | 3/2007 | Kwon et al. | |
| 2007/0056013 | A1 | 3/2007 | Duncan | |
| 2007/0070856 | A1* | 3/2007 | Tebele | 369/85 |
| 2007/0080823 | A1 | 4/2007 | Fu et al. | |
| 2007/0083814 | A1* | 4/2007 | Wilbrink et al. | 715/716 |
| 2007/0086724 | A1 | 4/2007 | Grady et al. | |
| 2007/0106760 | A1 | 5/2007 | Houh et al. | |
| 2007/0173197 | A1* | 7/2007 | Hsiung | 455/3.06 |
| 2007/0173294 | A1* | 7/2007 | Hsiung | 455/569.1 |
| 2007/0206827 | A1 | 9/2007 | Tupman et al. | |
| 2007/0226384 | A1 | 9/2007 | Robbin et al. | |
| 2007/0236482 | A1 | 10/2007 | Proctor et al. | |
| 2007/0247794 | A1 | 10/2007 | Jaffe et al. | |

FOREIGN PATENT DOCUMENTS

| | | | |
|---|---|---|---|
| EP | 1367734 | A1 | 12/2003 |
| EP | 1594319 | A | 11/2004 |
| EP | 1498899 | A | 1/2005 |
| EP | 1672613 | A | 6/2006 |
| GB | 2405718 | A | 3/2005 |
| JP | 07-176351 | | 7/1995 |
| JP | 10-321302 | | 4/1998 |
| JP | 10-334993 | | 12/1998 |
| JP | 11-288420 | | 10/1999 |
| JP | 2000-214953 | | 8/2000 |
| JP | 2000-223215 | | 8/2000 |
| JP | 2000-223216 | | 8/2000 |
| JP | 2000-223218 | | 8/2000 |
| JP | 2001-035603 | | 2/2001 |
| JP | 2001-069165 | A | 3/2001 |
| JP | 2001-196133 | | 7/2001 |
| JP | 2001-230021 | | 8/2001 |
| JP | 2001-332350 | | 11/2001 |
| JP | 2002-025720 | | 1/2002 |
| JP | 2002-203641 | | 7/2002 |
| JP | 2002 245719 | | 8/2002 |
| JP | 2002-252566 | | 9/2002 |
| JP | 3090747 | U | 10/2002 |
| JP | 2002-342659 | | 11/2002 |
| JP | 2002-374447 | | 12/2002 |
| JP | 2003-17165 | | 1/2003 |
| JP | 2003-032351 | | 1/2003 |
| JP | 2003-274386 | | 9/2003 |
| WO | WO 99/26330 | | 5/1999 |
| WO | WO 00/39907 | | 7/2000 |
| WO | WO 00/60450 | | 10/2000 |
| WO | WO 02/49314 | | 6/2002 |
| WO | WO 03/036541 | A1 | 5/2003 |
| WO | WO 03/036957 | A1 | 5/2003 |
| WO | WO 03/073688 | | 9/2003 |
| WO | WO 2004/084413 | | 9/2004 |
| WO | WO 2004/112311 | A | 12/2004 |
| WO | WO 2005/119463 | A | 12/2005 |
| WO | WO 2006/080957 | | 8/2006 |

OTHER PUBLICATIONS

Belkin iPod Voice Recorder, Product Specification Sheet, printed Jun. 16, 2004.

"How to Connect Your Computer, PC Hardware", downloaded Oct. 16, 2001, http:///www.scar.utoronto.ca!~ccweb/faculty/connect-howto.html.

"ipodDock/iPod Cradle," www.bookendzdocks.com/bookendz/dock_cradle.htm, downloaded Feb. 27, 2003.

"Neuros MP3 Digital Audio Computer," www.neurosaudio.com, downloaded Apr. 9, 2003.

Altec Lansing, "inMotion Users Guide," Corp. Headquarters, 535 Rte.6 & 209, Milford, PA 18337.

Anonymous: "Future of Digital Music in Windows," Microsoft Windows Hardware Developer Central Archive, [Online] Dec. 4, 2001 URL:http://www.microsoft.com/whdc/archive/digitaudio.mspx> [retrieved on Jan. 15, 2008].

Anonymous: "Introduction to Digital Audio," Microsoft Windows Hardware Developer Central Archive, [Online] Dec. 4, 2001 URL:http://www.microsoft.com/whdc/archive/digitaudio.mspx> [retrieved on Jan. 15, 2008].
Anonymous; "Windows and Red Book Audio" Microsoft Windows Hardware Developer Central Archive, [Online] Dec. 4, 2001 URL:http://www.microsoft.com/whdc/archive/Dmfuture.mspx> [retrieved Jan. 15, 2008].
"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.htmml.
Bindra, Ashok, "Standard Turns Monitor into I/O Hub," *Electronic Engineering Times*, vol. 918, Sep. 6, 1996, p. 14.
Brentrup, "Introduction to Public Key Cryptography Demystified," Campus Technology, printed from http://www.campus-technologv.com/article.asp?id=7626 on Oct. 6, 2004.
Brown, "Making USB Work", downloaded Oct. 16, 2001, PC Magazine: PC Tech wysiwyg:/ 15 5/http://www.zdnet.com/pcmag/pctech/content!18/04/tu1804.001.html.
"Cables to Go," download Oct. 16, 2001 http://www.cablestogo.com/product.asp?cat%5Fid=601&sku=27028.
Crawford et al., "Sample rate conversion and bit rate reduction in the studio," IEE Colloquim on Digital Audio Signal Processing, May 22, 1991, pp. 8-1.
Derman, Glenda, "Monitors Make Net Connections," *Electronic Engineering Times*, vol. 933, 1996, pp. 60 and 69.
"ExpressBus™ F5U010 User Guide Packing Checklist", Belkin Components.
"FireWire", downloaded Oct. 16, 2001, si wyg:/ /4 2/http://developerapple. comlhardwarelFire Wire.
"Fire Wire Connector", downloaded Oct. 16, 2001, wysiwyg:/176/http://developerapple.com/...es/Macintosh_CPUsG3/ibook/ibook-27.html.
Fried, "New Fire Wire to blaze faster trail", downloaded Oct. 16, 2001, CNETNews.com, http://news.cnet.com/news/0-I006-200-6021210.html.
Fried, "FireWire poised to become ubiquitous", downloaded Oct. 16, 2001, CNET News.com, 1394 Trade Association: Press, wysiwyg:/132/http:/ 11394ta.org/Press/200 1 Press/august!8.2 7. b.html.
"IEEE 1394/USB Comparison", downloaded Oct. 16, 2001, www.genitech.com.aulLIBRARY/TechSupportiinfobits/firewirevsusb.htm.
"Introduction to Public Key Crypotography," Oct. 9, 1998, printed from http://developer.netscape.com/docs/manuals/security/pkin/contents.htm on Oct. 6, 2004.
Lambert, "Digital Audio Interfaces," Journal of the Audio Engineering Society Audio Engineering Society, New York, NY vol. 38, No. 9, (Sep. 1, 1990), pp. 681-684, 686, 68 XP000175146 ISSN: 1549-4950 figures 9, 10.
Lewis, "On Technology." *Fortune Magazine*, Dec. 9, 2002.
Menezes et al., "Handbook of Applied Cryptography," Identification and Entity Authentication, pp. 385-424.
"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document.
Networking Tech Note, "1394 Standards and Specifications," 3 pgs.
"PMC FW2 IEEE1394 FireWire Controller", downloaded Oct. 16, 2001, http://www.bvmltd.co.uk/PMCfw2ds.html.
Severance, "FireWire Finally Comes Home", Michigan State University, Nov. 1998, pp. 117-118.
Sinitsyn, Alexander, "Synchronization Framework For Personal Mobile Servers," *Pervasive Computing and Communications Workshops* (*PERCOMW'04*), Proceedings of the Second IEEE Annual Conference, Piscataway, NJ, USA, IEEE, Mar. 14, 2004, pp. 208-212.
Teener, "Understanding Fire Wire: The IEEE 1394 Standards and Specifications", downloaded Oct. 16, 2001, wysiwyg:119/http:1lwww.chipcenter.com/networking/ieee 1394/main.html.
"The Authoritative Dictionary of IEEE Standards Terms, Seventh Edition", Pbulished by Standards Information Network, IEEE Press.
"Universal serial bus specification—rev 2.0," XP002474828, Chapter 9, USB Device Framework, pp. 239-274.
Vitaliano, "Why FireWire is Hot!Hot!Hot!", downloaded Oct. 16, 2001, "Impact.Fire Wire. SideBar" http://www.vxm.com/21R.35.html.
Whittle, "Public Key Authentication Framework: Tutorial," First Principles Consulting, Jun. 2, 1996.
iPod Classic User's Guide, acquired from apple.com, 2002; 44 pages.
iPod nano Features Guide, acquired from apple.com, 2008; 72 pages.
iPod touch User's Guide, acquired from apple.com, 2008, 120 pages.
Microsoft, "Media Transfer Protocol Implementation Details," 2005, 18 pages.
MAXTech Technology Ltd., CES 2000/Las Vegas, Jan. 6-9, 2000, [on line], [retrieved on Sep. 26, 2008]. Retrieved from the Internet <URL:http://web.archive.org/web/20000930170634/www.maxtech.com.hk/t-details.htm>. 2 pages.
MAXTech Technology Ltd., CES 2000/Las Vegas, Jan. 6-9, 2000, [online], [retrieved on Sep. 23, 2008]. Retrieved from the Internet <URL:http://web.archive.org/web/20010223230441/www.maxtech.com.hk/g-p06.htm>. 2 pages.

* cited by examiner

| Pin | Signal name | I/O | Function |
|---|---|---|---|
| 1 | DGND | I | Digital ground |
| 2 | DGND | I | Digital ground |
| 3 | TPA+ | I/O | Firewire signal |
| 4 | USB D+ | I/O | USB signal |
| 5 | TPA- | I/O | Firewire signal |
| 6 | USB D- | I/O | USB signal |
| 7 | TPB+ | I/O | Firewire signal |
| 8 | USB PWR | I | USB power in. NOT for powering; only to detect USB host |
| 9 | TPB- | I/O | Firewire signal |
| 10 | Accessory Identify | I | Pull down in dock to notify iPod of specific device |
| 11 | F/W PWR+ | I | Firewire and charger input power (8V to 30V dc) |
| 12 | F/W PWR+ | I | Firewire and charger input power (8V to 30V dc) |
| 13 | ACCESSORY PWR(3V3) | O | 3.3V output from iPod. Current limited to 100mA. |
| 14 | Reserved | | |
| 15 | DGND | GND | Digital ground in iPod |
| 16 | DGND | GND | Digital ground in iPod |
| 17 | Reserved | | |
| 18 | Dock Tx | I | Serial protocol (Data to iPod) |
| 19 | Dock Rx | O | Serial protocol (Data from iPod) |
| 20 | Accessory Detect | I/O | |
| 21 | S Video Y | O | Luminance component |
| 22 | S Video C | O | Chrominance component |
| 23 | Video Composite | O | Composite signal |
| 24 | Remote Sense | I | Detect remote |
| 25 | LINE-IN L | I | Line level input to the iPod for the left channel |
| 26 | LINE-IN R | I | Line level input to the iPod for the right channel |
| 27 | LINE-OUT L | O | Line level output to the iPod for the left channel |
| 28 | LINE-OUT R | O | Line level output to the iPod for the right channel |
| 29 | Audio Return | GND | Audio return - Signal, never to be grounded inside accessory |
| 30 | DGND | GND | Digital ground iPod |
| 31 | Chassis | | Chassis ground for connector shell |
| 32 | Chassis | | Chassis ground for connector shell |

FIG. 3A

| Pin | Signal name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video signal |
| 6 | Accessory 3.3V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG. 3B

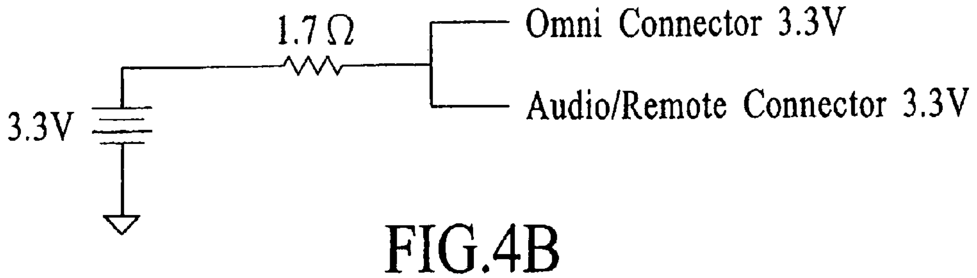

FIG.4B

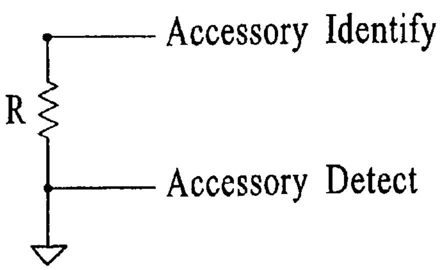

FIG.4C

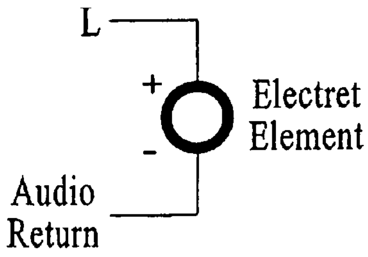

FIG.4D

METHOD AND SYSTEM FOR TRANSFERRING STORED DATA BETWEEN A MEDIA PLAYER AND AN ACCESSORY

FIELD OF THE INVENTION

The present invention relates generally to electrical devices and more particularly to electrical devices such as media players that communicate with accessory devices.

BACKGROUND OF THE INVENTION

A media player stores media assets, such as audio tracks or photos that can be played or displayed on the media player. One example of a media player is the iPod® media player, which is available from Apple Computer, Inc. of Cupertino, Calif. Often, a media player acquires its media assets from a host computer that serves to enable a user to manage media assets. As an example, the host computer can execute a media management application to manage media assets. One example of a media management application is iTunes®, version 6.0, produced by Apple Computer, Inc.

A media player typically includes one or more connectors or ports that can be used to interface to the media player. For example, the connector or port can enable the media player to couple to a host computer, be inserted into a docking system, or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

Currently, the connectors or ports of a media player are open for use so long as a compatible connector or port is utilized. Consequently, numerous third-parties have developed accessory devices for use with other manufacturers' media players. One difficulty is that since a media player communicates with a variety of accessories must store information retrieved from each of the accessory in the file format of the accessory. Conversely if an accessory stores information in the media player it must do so in a compatible manner.

Thus, there is a need for improved techniques to enable manufacturers of electronic devices to control the nature and extent to which accessory devices can be utilized with other electronic devices.

SUMMARY OF THE INVENTION

A method, system and connector interface for transferring stored data between a media player and an accessory is disclosed. The method and system comprises obtaining by one of the media player and the accessory a unique identifier for a particular file stored in the other of the media player and the accessory; and returning the unique identifier with the stored file data to the one of the media player and the accessory. The system and method includes utilizing the stored file by the one of the media player or the accessory.

In the method, system and connector interface in accordance with the present invention, accessories and media players are able to retrieve and store data utilizing an arbitrary format. This data is opaque to any protocol used by the media player and requires no parsing or interpretation. To provide this facility, a plurality of commands allows both media players and accessories to present a simple file system. The plurality of commands could be utilized in a variety of environments.

BRIEF DESCRIPTION OF THE DRAWINGS

FIG. 3A illustrates the connector pin designations for the docking connector.

FIG. 3B illustrates the connection pin designations for the remote connector.

FIG. 4B illustrates a reference schematic diagram for an accessory power source.

FIG. 4C illustrates a reference schematic diagram for a system for detecting and identifying accessories for the docking connector.

FIG. 4D is a reference schematic of an electret microphone that may be within the remote connector.

DETAILED DESCRIPTION OF THE INVENTION

The present invention relates generally to electrical devices and more particularly to electrical devices such as media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

In a method and system in accordance with the present invention, accessories and media players are able to retrieve and store data utilizing an arbitrary format. This data is opaque to any protocol used by the media player and requires no parsing or interpretation. To provide this facility, a plurality of commands allows both media players and accessories to present a simple file system. The plurality of commands could be utilized in a variety of environments. One such environment is within a connector interface system environment such as described in detail hereinbelow.

Connector Interface System Overview

To describe the features of the connector interface system in accordance with the present invention in more detail, refer now to the following description in conjunction with the accompanying drawings.

Docking Connector

Figure 1A:
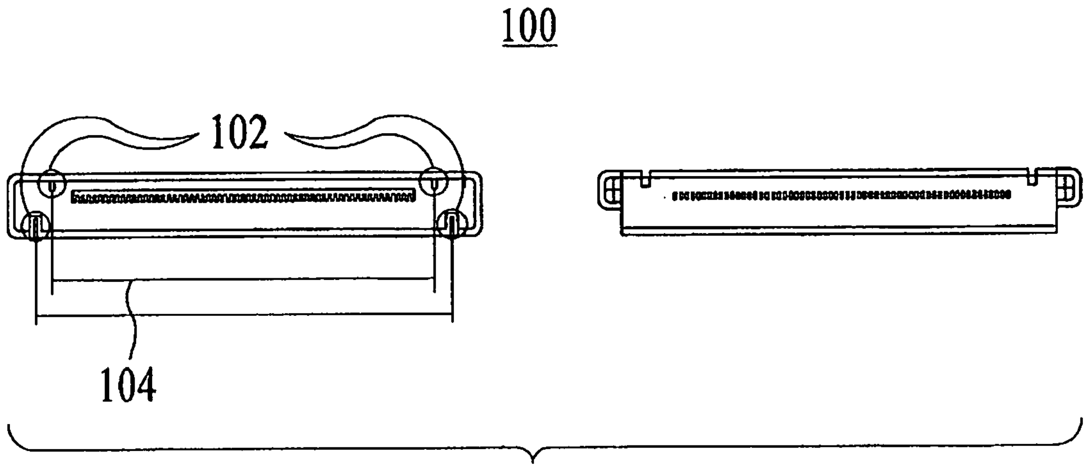
FIGS. 1A and 1B illustrate a docking connector in accordance with the present invention.
Figure 1B:
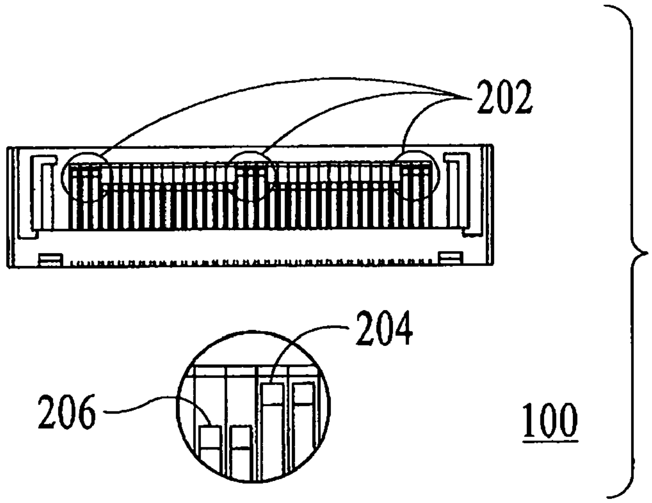

FIGS. 1A and 1B illustrate a docking connector 100 in accordance with the present invention. Referring first to FIG. 1A, the keying features 102 are of a custom length 104. In addition, a specific key arrangement where one set of keys are separated by one length are at the bottom and another set of keys are separated by another length at the top of the connector is used. The use of this key arrangement prevents noncompliant connectors from being plugged in and causing potential damage to the device. The connector for power utilizes a Firewire specification for power. The connector includes a first make/last break contact to implement this scheme. FIG. 1B illustrates the first make/last break contact 202 and also illustrates a ground pin and a power pin related to providing an appropriate first mate/last break contact. In this example, the ground pin 204 is longer than the power pin 206. Therefore, the ground pin 204 would contact its mating pin in the docking accessory before the power pin 206. Therefore internal electrical damage of the electronics of the device is minimized.

In addition, a connector interface system in accordance with the present invention uses both USB and Firewire interfaces as part of the same docking connector alignment, thereby making the design more compatible with different types of interfaces, as will be discussed in detail hereinafter. In so doing, more remote accessories can interface with the media player.

Remote Connector

Figure 2A:
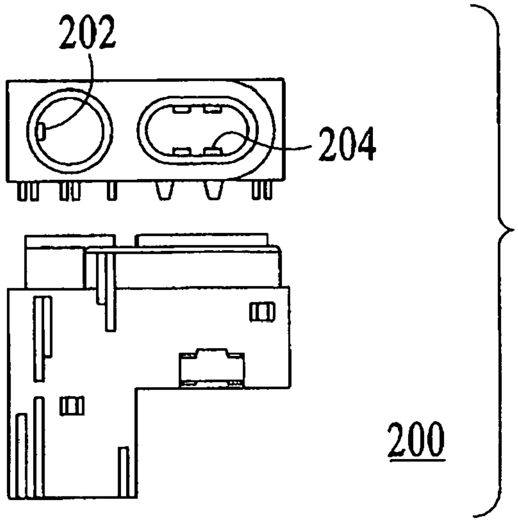
FIG. 2A is a front and top view of a remote connector in accordance with the present invention.
Figure 2B:
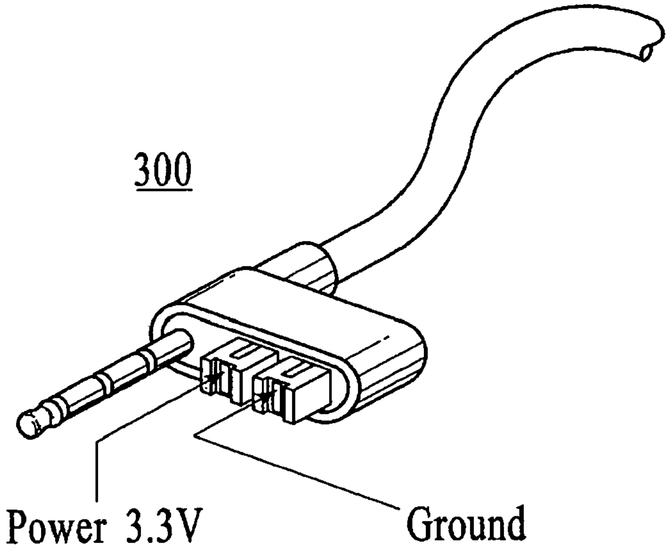
FIG. 2B illustrates a plug to be utilized in the remote connector.
Figure 2C:
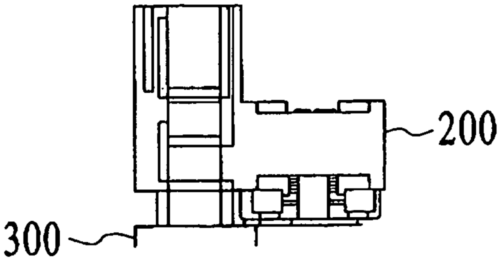
FIG. 2C illustrates the plug inserted into the remote connector.

The connection interface system also includes a remote connector which provides for the ability to output audio, input audio, provides I/O serial protocol, and to provide an output video. FIG. 2A is a front and top view of a remote connector 200 in accordance with the present invention. As is seen, the remote connector 200 includes a top headphone receptacle 202, as well as a second receptacle 204 for remote devices. FIG. 2B illustrates a plug 300 to be utilized in the remote connector. The plug 300 allows the features to be provided via the remote connector. FIG. 2C illustrates the plug 300 inserted into the remote connector 200. Heretofore, all these features have not been implemented in a remote connector. Therefore, a standard headphone cable can be plugged in but also special remote control cables, microphone cables and video cables could be utilized with the remote connector.

To describe the features of the connector interface system in more detail, please find below a functional description of the docking connector, remote connector and a command set in accordance with the present invention.

Docking and Remote Connector Specifications

For an example of the connector pin designations for both the docking connector and for the remote connector for a media player such as an iPod device by Apple Computer, Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
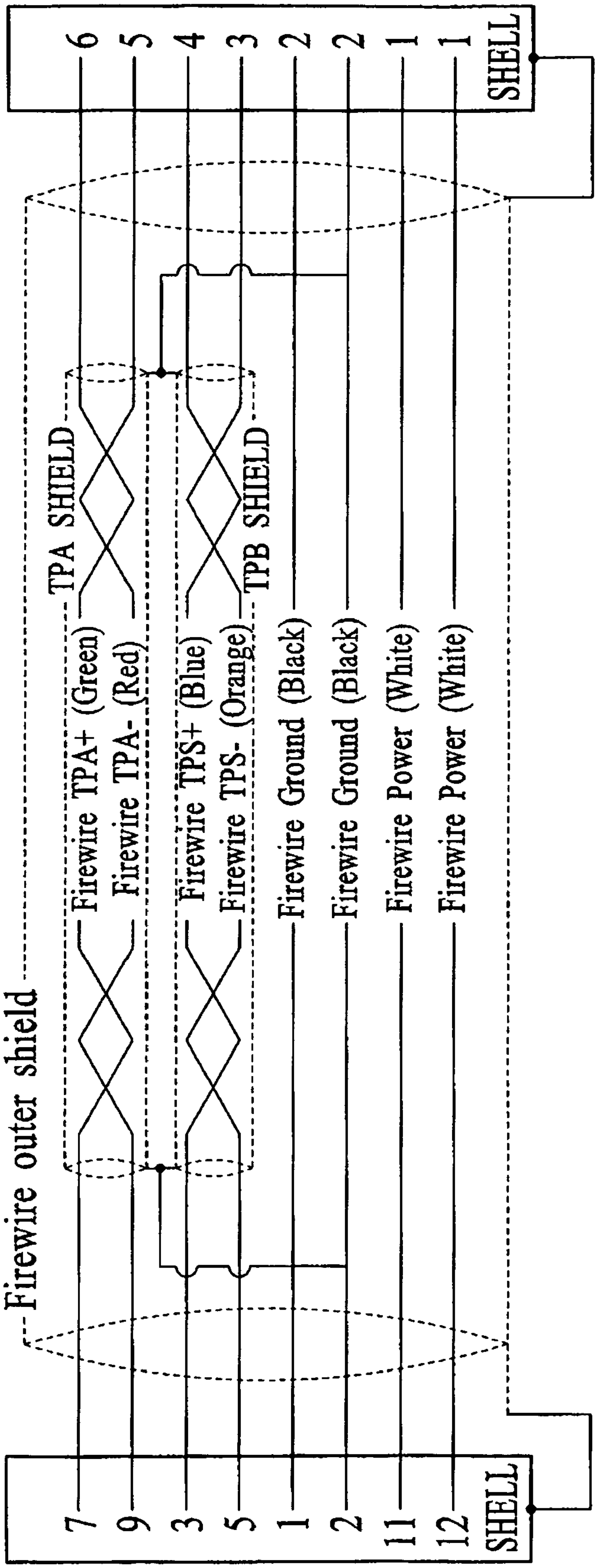
FIG. 4A illustrates a typical FireWire connector interface for the docking connector.

FIG. 4A illustrates a typical Firewire connector interface for the docking connector:

Firewire Power:

a) 8V-30V DC IN b) 10 W Max

Firewire:

a) Designed to IEEE 1394 A Spec (400 Mb/s)

USB Interface

The media player provides two configurations, or modes, of USB device operation: mass storage and media player USB Interface (MPUI). The MPUI allows the media player to be controlled using a media player accessory protocol (MPAP) which will be described in detail later herein, using a USB Human Interface Device (HID) interface as a transport mechanism.

Accessory 3.3 V Power

FIG. 4B illustrates the accessory power source. The media player accessory power pin supplies voltages, for example, 3.0 V to 3.3V+/−5% (2.85 V to 3.465 V) over the 30-pin connector and remote connector (if present). A maximum current is shared between the 30-pin and Audio/Remote connectors.

By default, the media player supplies a particular current such as 5 mA. Proper software accessory detect is required to turn on high power (for example, up to 100 mA) during active device usage. When devices are inactive, they must consume less than a predetermined amount of power such as 5 mA current.

Accessory power is switched off for a period of, for example, approximately 2 seconds during the media player bootstrap process. This is done to ensure that accessories are in a known state and can be properly detected. All accessories are responsible for re-identifying themselves after the media player completes the bootstrap process and transitions accessory power from the off to the on state.

Accessory power is grounded through the F/W GND pins.

FIG. 4C illustrates a reference schematic diagram for a system for detecting and identifying accessories for the docking connector. The system comprises:

a) A resistor to ground allows the device to determine what has been plugged into docking connector. There is an internal pullup on Accessory Identify.

b) Two pins required (Accessory Identify & Accessory Detect)

FIG. 4D is a reference schematic of an electret microphone that is within the remote connector.

Serial Protocol Communication:

a) Two pins used to communicate to and from device (Rx & Tx)

b) Input & Output (0V=Low, 3.3V=High)

Figure 5A:
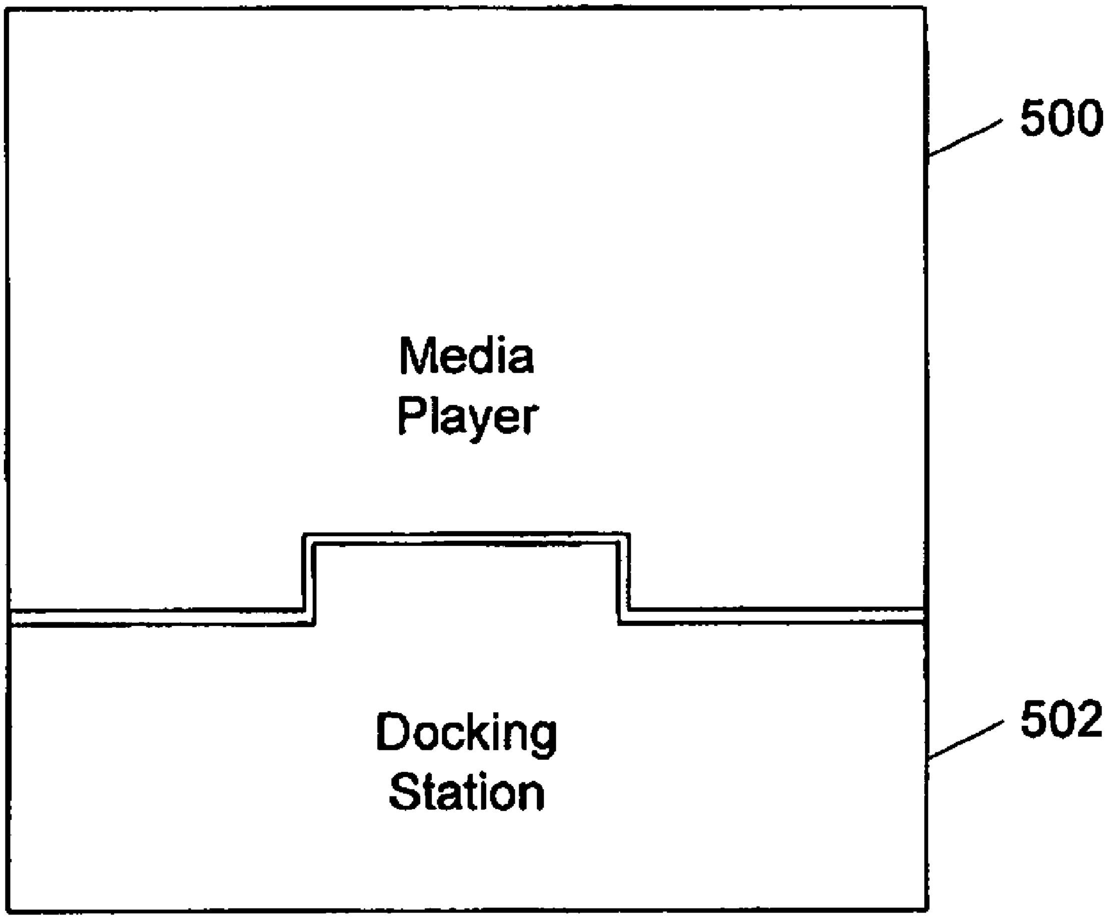
FIG. 5A illustrates a media player coupled to different accessories
Figure 5B:
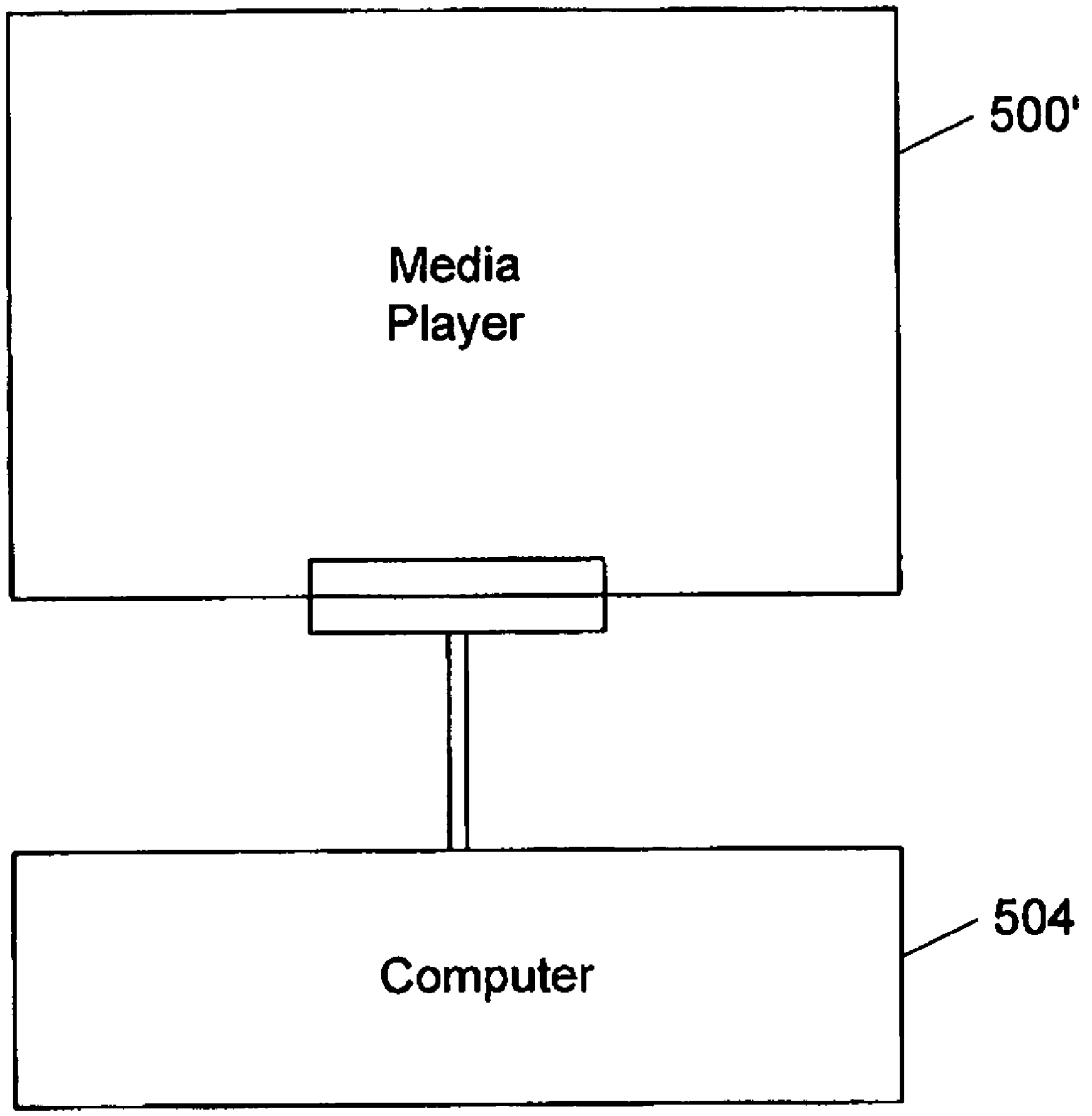
FIG. 5B illustrates the media player coupled to a computer.
Figure 5C:
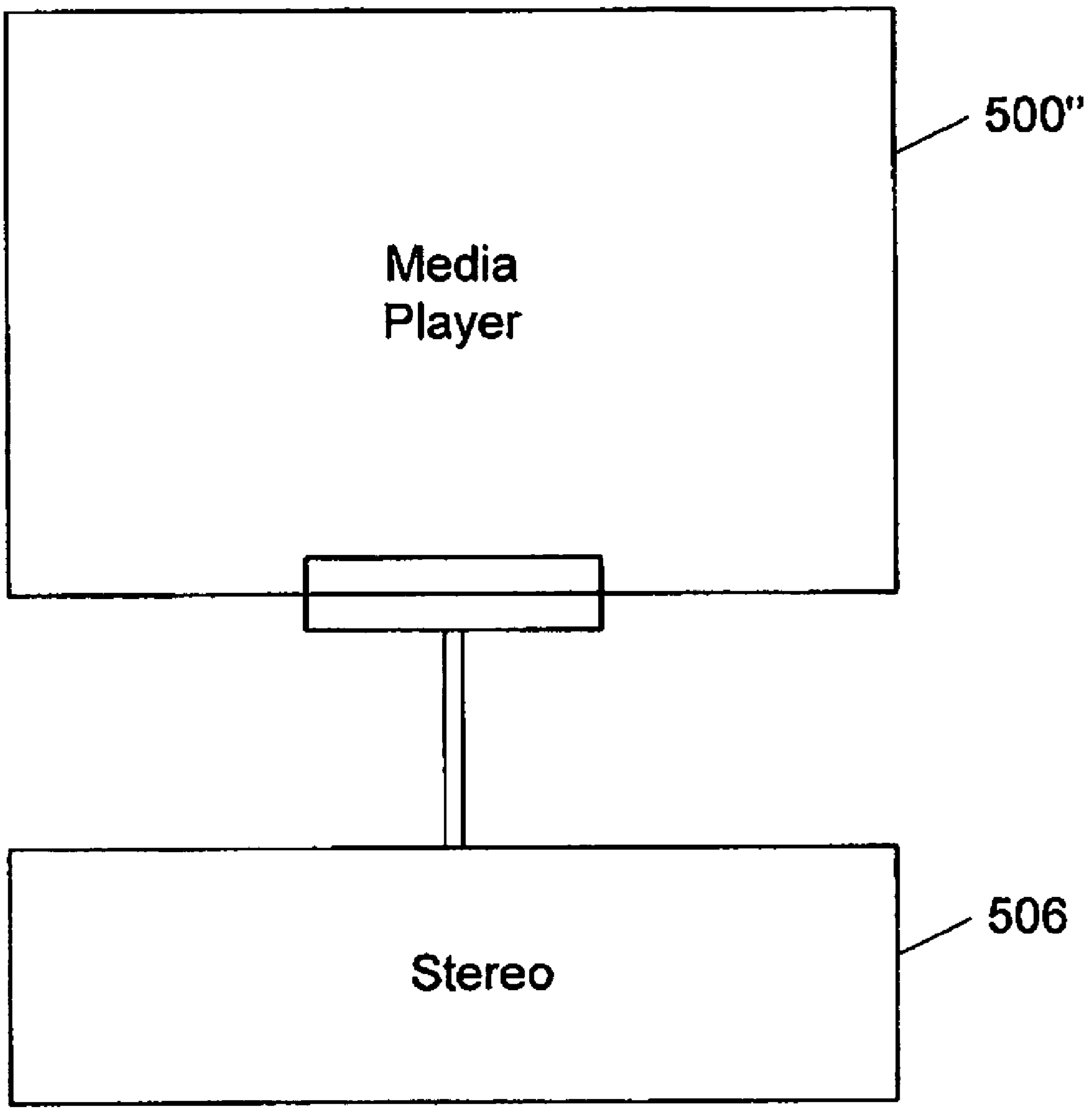
FIG. 5C illustrates the media player coupled to a car or home stereo system.
Figure 5D:
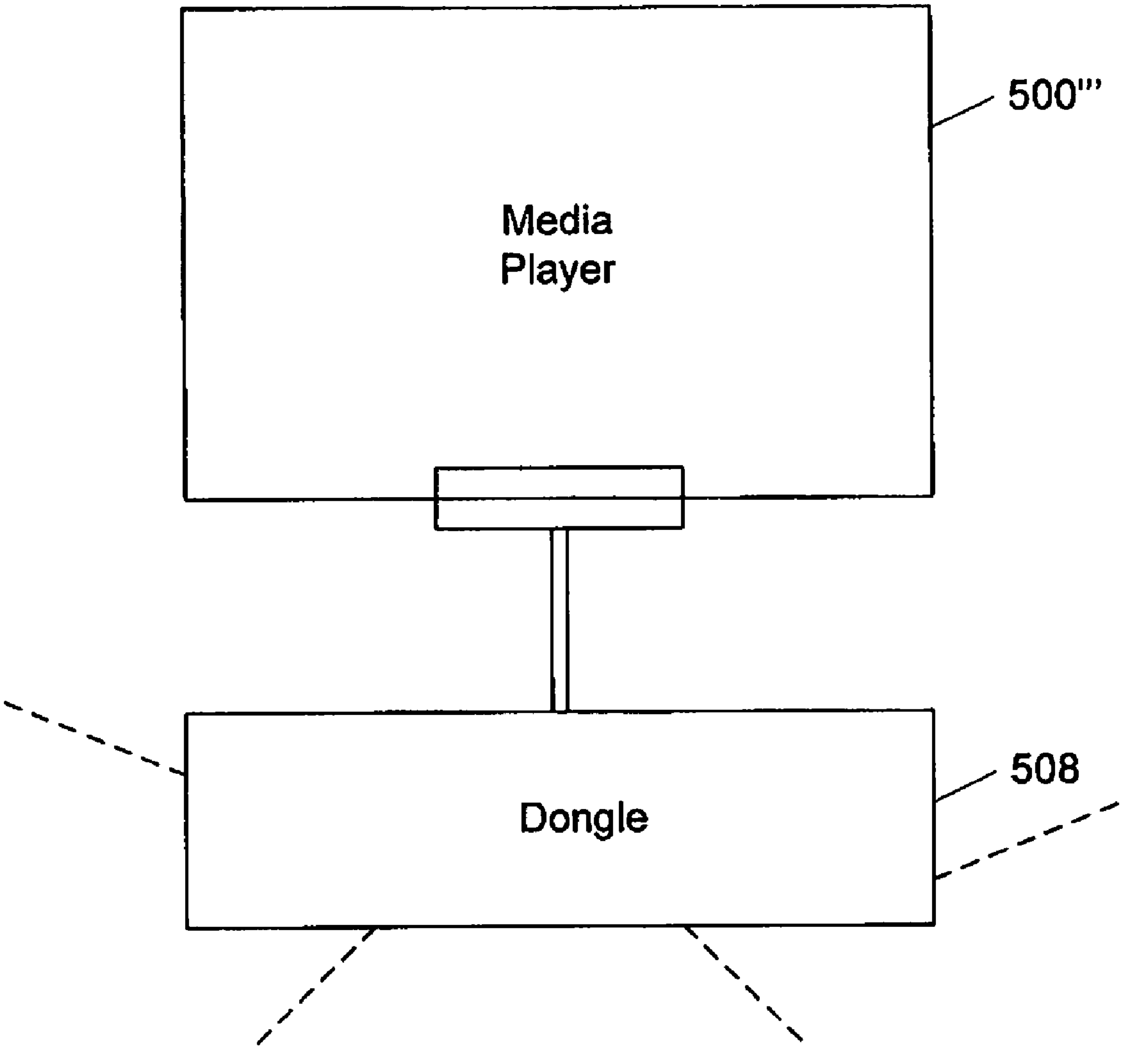
FIG. 5D illustrates the media player coupled to a dongle that communicates wirelessly with other accessories.
Figure 5E:
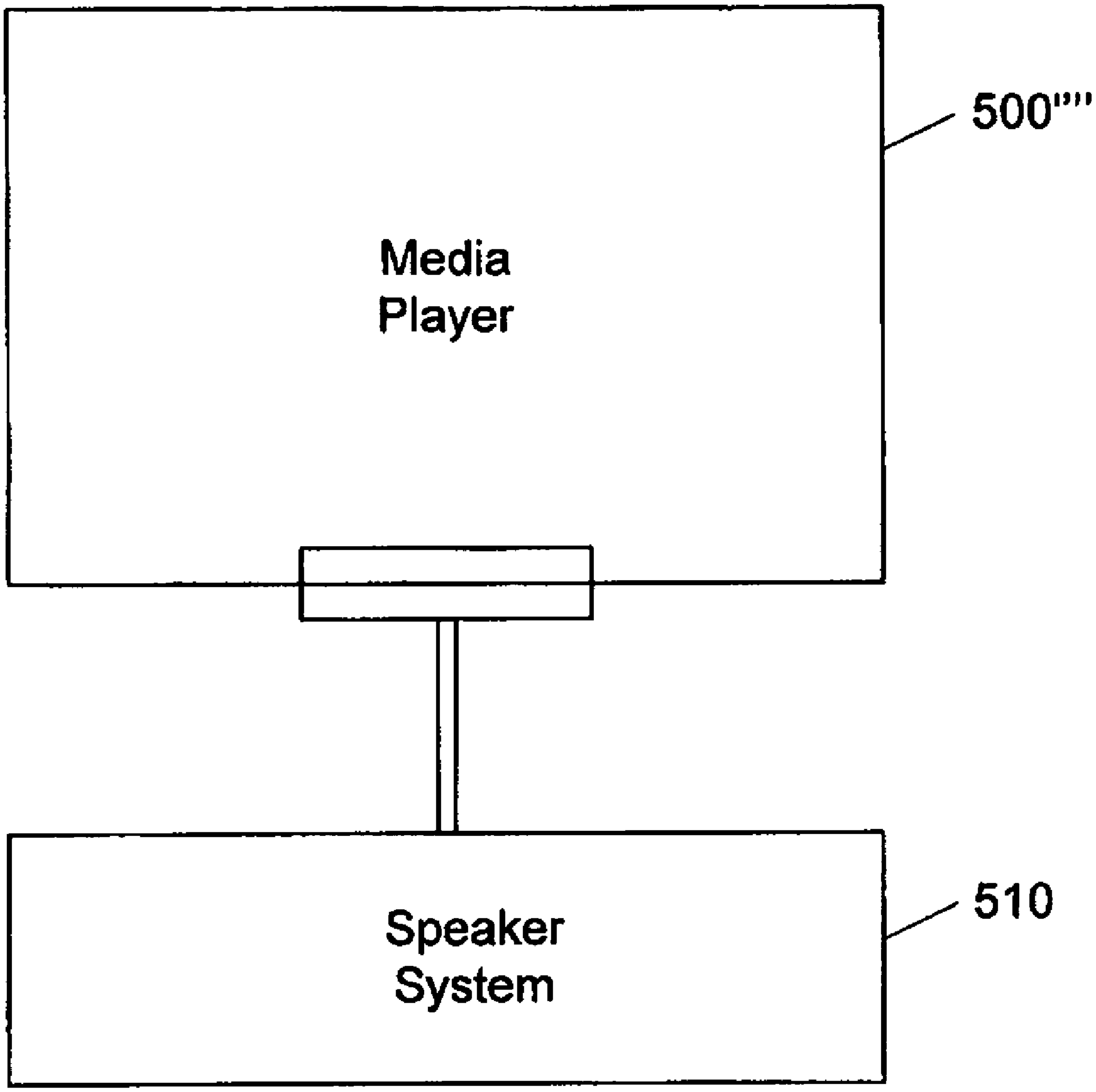
FIG. 5E illustrates the media player coupled to a speaker system.

As before mentioned, media players connect to a variety of accessories. FIGS. 5A-5E illustrates a media player 500 coupled to different accessories. FIG. 5A illustrates a media player 500' coupled to a docking station 502. FIG. 5B illustrates the media player 500" coupled to a computer 504. FIG. 5C illustrates the media player 500'" coupled to a car or home stereo system 506. FIG. 5D illustrates the media player 500"" coupled to a dongle 508 that communicates wirelessly with other devices. FIG. 5E illustrates the media player 500'"" coupled to a speaker system 510. As is seen, what is meant by accessories includes but is not limited to docking stations, chargers, car stereos, microphones, home stereos, computers, speakers, and accessories which communicate wirelessly with other accessories.

As before mentioned, this connector interface system could be utilized with a command set for allowing the transfer of storage data between a media player and an accessory. It should be understood by one of ordinary skill in the art that although the above-identified connector interface system could be utilized with the command set a variety of other connectors or systems could be utilized and they would be within the spirit and scope of the present invention. To describe the utilization of the command set in more detail refer now to the following description in conjunction with the accompanying Figure.

Figure 6:
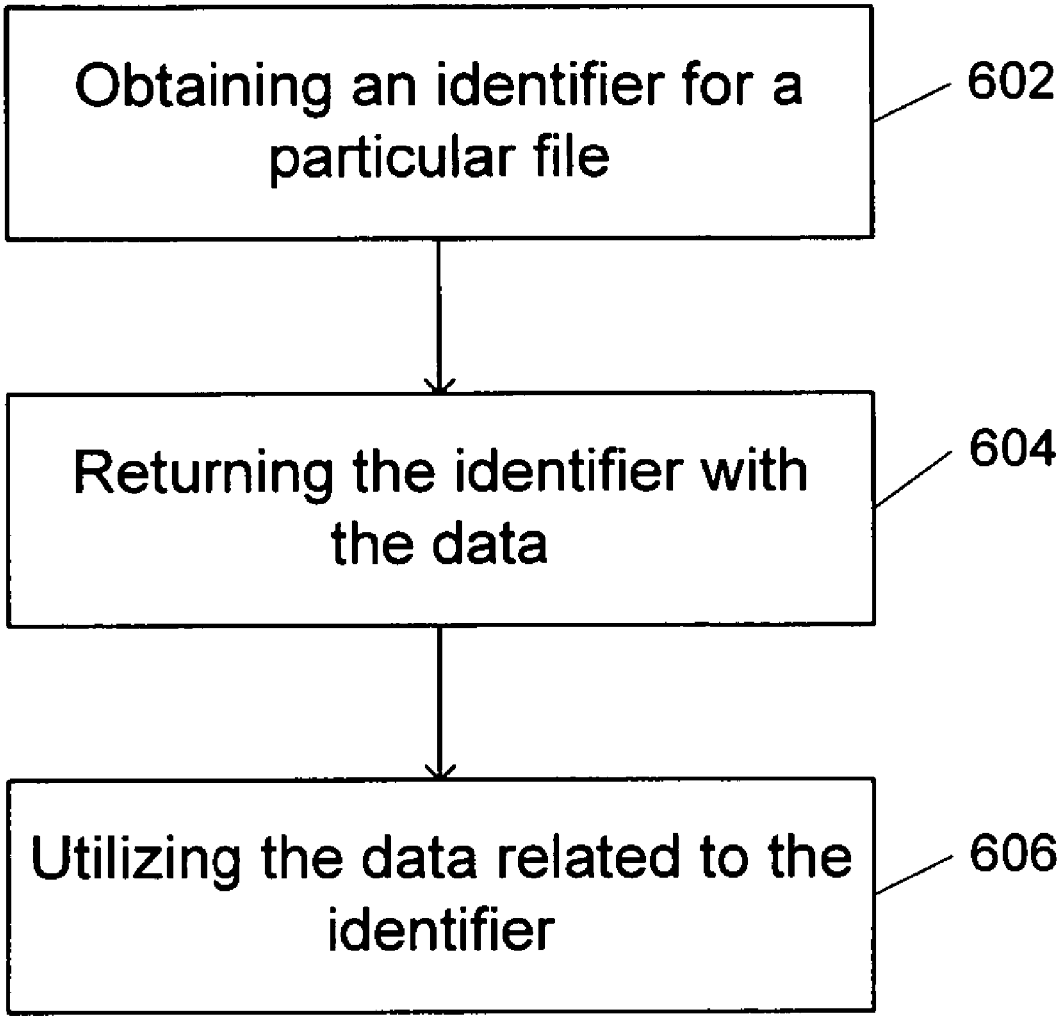
FIG. 6 is a flow chart which illustrates a process for allowing the transfer of data between a media player and an accessory.

FIG. 6 is a flow chart which illustrates the process for allowing the transfer of storage data between a media player and an accessory. As is seen, one of the accessory and the media player obtains a unique identifier for a particular file related to the other of the accessory and media player, via step 602. The identifier, for example, could be a unique file handle. Next, the unique identifier is returned to the one of the accessory or media player with the data associated with the identifier, via step 604. Finally, the data related to the identifier is utilized by the media player or the accessory, via step 606.

Based upon the commands utilized, this utilization can take many forms. For example, the data can be written by the media player or the accessory. In another example, the data could be read by the one of the media player or the accessory. In addition, the file can be closed after the data is read or written. In another example, data can be deleted after closing the file, or after the data is read or written depending on the environment. The following will describe in detail various commands which can be utilized to perform the process described hereinabove. In one embodiment for each command related to a media player, there is a reciprocal command for an accessory.

The commands for treating the media player as a file system are within a predetermined range of addresses. The parallel commands for treating an accessory as a file system are within a predetermined range of addresses. Typically if a particular command performs a specific operation on the media player file system, then a reciprocal command will perform the same operation on the accessory file system. In one embodiment commands are provided for allowing a media player and an accessory to transfer and store data.

Command Functionality

Although a plurality of commands is described hereinbelow, one of ordinary skill in the art recognizes that many other commands could be utilized and their use would be within the spirit and scope of the present invention. Accordingly, the list of commands below is representative but not exhaustive of the types of commands that could be utilized to transfer and store data between a media player and an accessory. Furthermore, it is also readily understood by one of ordinary skill in the art that a subset of these commands could be utilized by a media player or an accessory and that use would be within the spirit and scope of the present invention. A description of the functionality of some of these commands is described below.

Commands for acknowledging the receipt of a storage command from either the accessory or the media player.

Commands for asking the media player or the accessory to return its storage capabilities.

Commands for telling the accessory or the media player about its storage capabilities. The storage capabilities include but are not limited to the following features:

1. Total space available on the destination.
2. Maximum file size.
3. Maximum write size.
4. Maximum name length for a file on directory.
5. File system type.
6. Version number.
7. Definition of capability such as read/only, read/write or support subdirectory.
8. Defines where writing can begin.
9. Support renaming of a file.
10. Support directory command send as change directory, create directory and delete directory.

Commands for requesting the media player or the accessory to return a unique identifier of a file. In one embodiment the unique identifier persists until the accessory or media player detaches or closes the file, whichever comes first.

Commands where the media player or accessory returns a handle to identify the file.

Commands where the accessory or media player asks for a chunk of data to be returned from a file. In one embodiment these commands may result in several commands, as needed to fulfill the request.

Commands for the media player or accessory to transmit the data in response to the command from the other.

Commands where the accessory or media player writes a block of data to a file of the media player or the accessory.

Commands for closing the file and releasing the unique identifier of the media player or the accessory.

Commands for deleting the named file from the media player or the accessory.

Commands for requesting the number of files and subdirectories in the specified directory of the media player or the accessory.

Commands for returning the number of files and subdirectories in the directory of the media player or the accessory.

Commands for obtaining the listing of the contents of the specified directory of the media player or the accessory.

Commands for obtaining the results of a directory listing of the media player or the accessory. In one embodiment, a separate command is returned for each directory entry.

Commands for obtaining the status of the specified file or directory of the media player or accessory.

Commands for obtaining the results of a call to a specified file or directory of the media player or the accessory.

Commands where the accessory or media player asks the other to return the amount of free space on its storage system of the media player or the accessory.

Commands where the accessory or media player tells the other the amount of free space on its storage system of the media player or the accessory.

A method and system in accordance with the present invention provides a plurality of commands that allow accessories and media players to retrieve and store data utilizing an arbitrary format. In so doing, a media player and accessory can obtain each others' stored data in an official manner. Since both the media player and accessory are utilizing the same arbitrary format neither has to determine the file format of the other.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method performed by an accessory for transferring stored data between a media player and the accessory, the media player including a storage device for storing one or more files, the method comprising:

sending, by the accessory to the media player, a first command requesting storage capability information indicating one or more storage capabilities of the storage device, wherein the storage capability information includes one or more of: maximum file size information, maximum write size information, maximum filename length information, or filesystem type information;

receiving, by the accessory from the media player, a second command, in response to the first command, including the storage capability information;

sending, by the accessory to the media player, a third command requesting a unique identifier for a file stored on the storage device;

receiving, by the accessory from the media player, a fourth command, in response to the third command, including the unique identifier; and sending, by the accessory to the media player, a fifth command, in response to the fourth command, requesting execution of a storage operation with respect to the file, wherein the fifth command includes the unique identifier.

2. The method of claim 1, wherein the fifth command is a write command for writing data from the accessory to the file.

3. The method of claim 2, wherein the data is stored on a storage device of the accessory, and wherein subsequently to sending the fifth command, the data is deleted from the storage device of the accessory.

4. The method of claim 1, wherein the fifth command is a read command for reading data from the file to the accessory.

5. The method of claim 1, further comprising:

subsequently to sending the fifth command, sending to the media player a sixth command requesting closure of the file and release of the unique identifier.

6. The method of claim 1, further comprising:

subsequently to sending the fifth command, sending to the media player a sixth command requesting deletion of the file.

7. The method of claim 1, further comprising:

subsequently to sending the fifth command, receiving from the media player a sixth command acknowledging the fifth command.

8. The method of claim 1 further comprising:

sending to the media player a sixth command requesting storage status information indicating a status of the storage device; and receiving from the media player a seventh command including the storage status information.

9. The method of claim 8, wherein the storage status information includes one or more of: total free space on the storage device, total number of files or file directories stored on the storage device, total number of files or subdirectories in a specified file directory, contents of a specified file directory, status of a specified file, or status of a specified file directory.

10. A method performed by an accessory for transferring stored data between a media player and the accessory, the accessory including a storage device for storing one or more files, the method comprising:

receiving, by the accessory from the media players a first command requesting storage capability information indicating one or more storage capabilities of the storage device, wherein the storage capability information includes one or more of: maximum file size information, maximum write size information, maximum filename length information, or filesystem type information;

sending, by the accessory to the media player, a second command, in response to the first command, including the storage capability information;

receiving, by the accessory from the media player, a third command requesting a unique identifier for a file stored on the storage device;

sending, by the accessory to the media player, a fourth command, in response to the third command, including the unique identifier; and receiving, by the accessory from the media player, a fifth command, in response to the fourth command, requesting execution of a storage operation with respect to the file, wherein the fifth command includes the unique identifier.

11. The method of claim 10, wherein the fifth command is a write command for writing data from the media player to the file.

12. The method of claim 11, wherein the data is stored on a storage device of the media player, and wherein subsequently to receiving the fifth command, the data is deleted from the storage device of the media player.

13. The method of claim 10, wherein the fifth command is a read command for reading data from the file to the media player.

14. The method of claim 10, further comprising:

subsequently to receiving the fifth command, receiving from the media player a sixth command requesting closure of the file and release of the unique identifier.

15. The method of claim 10, further comprising:

subsequently to receiving the fifth command, receiving from the media player a sixth command requesting deletion of the file.

16. The method of claim 10, further comprising:

subsequently to receiving the fifth command, sending to the media player a sixth command acknowledging the fifth command.

17. The method of claim 10 further comprising:

receiving from the media player a sixth command requesting storage status information indicating a status of the storage device; and sending to the media player a seventh command including the storage status information.

18. The method of claim 17, wherein the storage status information includes one or more of: total free space on the storage device, total number of files or file directories stored on the storage device, total number of files or subdirectories in a specified file directory, contents of a specified file directory, status of a specified file, or status of a specified file directory.

19. An accessory for use with a media player, the media player including a storage device for storing one or more files, the accessory comprising:

an interface adapted to be coupled with the media player and configured to support a storage protocol for exchanging with the media player commands and information related to the storage device; and a control module coupled to the interface, the control module being configured to:

send to the media player a first command requesting storage capability information indicating one or more storage capabilities of the storage device, wherein the storage capability information includes one or more of: maximum file size information, maximum write size information, maximum filename length information, or filesystem type information;

receive from the media player a second command, in response to the first command including the storage capability information;

send to the media player a third command requesting a unique identifier for a file stored on the storage device;

receive from the media player a fourth command, in response to the third command including the unique identifier; and send to the media player a fifth command, in response to the fourth command, requesting execution of a storage operation with respect to the file, wherein the fifth command includes the unique identifier.

20. The accessory of claim 19, wherein the interface comprises a connector having a plurality of signal pins, the signal pins being arranged to mate with corresponding signal pins on a mating connector of the media player.

21. The accessory of claim 20, wherein the plurality of signal pins includes a pair of serial pins and wherein the first, third, and fifth commands are sent via a transmit pin of the pair of serial pins.

22. The accessory of claim 21, wherein the plurality of signal pins further includes:

a ground pin and a power pin adapted such that the ground pin makes contact with a corresponding ground pin in the mating connector of the media player before the power pin makes contact with a corresponding power pin in the mating connector of the media player;

a Firewire signal pin;

a USB signal pin;

a USB power pin;

an accessory identify signal pin;

an accessory detect signal pin;

a video output pin;

an accessory power pin;

a remote sense signal pin; and a line signal pin.

23. The accessory of claim 20, wherein the connector comprises a keying arrangement, and wherein one set of keys are separated by one length and another set of keys are separated by another length.

* * * * *